United States Patent
Bennett et al.

(10) Patent No.: US 11,254,829 B2
(45) Date of Patent: Feb. 22, 2022

(54) NON-AQUEOUS INK COMPOSITIONS (71) Applicant: HEWLETT-PACKARD DEVELOPMENT COMPANY, L.P., Spring, TX (US)

(72) Inventors: Kamila Bennett, Corvallis, OR (US); Larrie Deardurff, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,231

(22) PCT Filed: Jun. 14, 2018

(86) PCT No.: PCT/US2018/037547
§ 371 (c)(1),
(2) Date: Oct. 15, 2019

(87) PCT Pub. No.: WO2019/212577
PCT Pub. Date: Nov. 7, 2019

(65) Prior Publication Data
US 2021/0230438 A1 Jul. 29, 2021

(30) Foreign Application Priority Data
Apr. 30, 2018 (WO) ................ PCT/US2018/030085
Apr. 30, 2018 (WO) ................ PCT/US2018/030089

(51) Int. Cl.
C09D 11/103 (2014.01)
B41M 5/00 (2006.01)
(Continued)

(52) U.S. Cl.
CPC .......... *C09D 11/103* (2013.01); *B41J 2/2107* (2013.01); *B41M 5/0023* (2013.01); *C09D 11/328* (2013.01); *C09D 11/36* (2013.01)

(58) Field of Classification Search
CPC .............. B41M 5/0076; B41M 5/0047; B41M 5/0011; B41M 5/0017; B41M 5/0023;
(Continued)

(56) References Cited
U.S. PATENT DOCUMENTS
3,043,787 A 7/1962 Alberto et al.
3,413,250 A 11/1968 Varron et al.
(Continued)

FOREIGN PATENT DOCUMENTS
CN 107780264 A 3/2018
EP 3263660 A1 1/2018
(Continued)

*Primary Examiner* — Manish S Shah
(74) *Attorney, Agent, or Firm* — Thorpe North & Western LLP (57) ABSTRACT The present disclosure is drawn to non-aqueous ink compositions. The non-aqueous ink compositions can include from 70 wt % to 98 wt % alcohol solvent, from 1 wt % to 6 wt % phenol-formaldehyde resin, from 1 wt % to 5 wt % tackifier, and from 1 wt % to 14 wt % organic solvent-soluble dye. The tackifier can include a shellac having an acid number from 50 KOH/g to 100 mg KOH/g or a tackifier resin having an acid number from 100 mg KOH/g to 300 mg KOH/g.

17 Claims, 1 Drawing Sheet

100 ejecting a non-aqueous ink composition onto a non-porous polymeric substrate, the non-aqueous ink compositing, comprising from 70 wt% to 98 wt% alcohol solvent, from 1 wt% to 6 wt% phenol-formaldehyde resin, from 1 wt% to 5 wt% tackifier, and from 1 wt% to 14 wt% organic solvent-soluble dye, wherein the tackifier includes a shellac having an acid number from 50 KOH/g to 100 mg KOH/g or a tackifier resin having an acid number from 100 mg KOH/g to 300 mg KOH/g ⎯ 102

(51) Int. Cl.
*C09D 11/328* (2014.01)
*C09D 11/36* (2014.01)
*B41J 2/21* (2006.01)

(58) Field of Classification Search
CPC ........ B41M 7/00; B41M 7/0072; B41M 5/52; B41M 5/5218; B41M 5/5227; B41M 7/0081; B41M 3/006; B41M 3/003; B41J 11/002; B41J 11/00; B41J 2/2107; B41J 2/01; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 11/0021; C09D 11/322; C09D 11/033; C09D 11/101; C09D 11/102; C09D 11/037; C09D 151/08; C09D 11/326; C09D 11/107; C09D 11/03; C09D 11/36; C09D 11/40; C09D 11/30; C09D 11/38; C09D 11/32; C09D 11/324; C09D 11/328; C09D 11/005; C09D 11/54; C09D 11/52; C09D 11/106; C14C 11/006; G02B 5/20; G02B 5/223; C08K 3/11; C08K 2003/2237
See application file for complete search history.

(56) References Cited

U.S. PATENT DOCUMENTS

| | | | |
|---|---|---|---|
| 3,666,710 A | * | 5/1972 | Makhlouf .............. C08F 2/08 524/461 |
| 4,155,895 A | | 5/1979 | Rohowetz et al. |
| 4,290,072 A | | 9/1981 | Mansukhani |
| 5,429,860 A | | 7/1995 | Held et al. |
| 6,251,175 B1 | | 6/2001 | Zhu et al. |
| 6,726,756 B1 | * | 4/2004 | Zou ..................... C09D 11/30 106/31.37 |
| 7,297,729 B2 | | 11/2007 | Sexton et al. |
| 8,287,112 B2 | | 10/2012 | Thillo et al. |
| 2003/0215281 A1 | | 11/2003 | Sexton et al. |
| 2008/0066239 A1 | * | 3/2008 | Zhu ..................... C09D 11/36 8/525 |
| 2008/0286484 A1 | * | 11/2008 | Tojo ................. B41M 7/0081 427/511 |
| 2009/0197056 A1 | * | 8/2009 | Yokoi ................. C09D 11/101 428/195.1 |
| 2009/0293765 A1 | * | 12/2009 | Hasegawa ........... C09D 11/328 106/31.48 |
| 2011/0012954 A1 | | 1/2011 | Brown et al. |
| 2012/0026257 A1 | | 2/2012 | Robertson et al. |
| 2012/0147087 A1 | | 6/2012 | Roberston et al. |
| 2013/0189503 A1 | | 7/2013 | Kozee et al. |
| 2013/0327247 A1 | | 12/2013 | Khavari |
| 2014/0065381 A1 | | 3/2014 | Romain et al. |
| 2014/0204149 A1 | * | 7/2014 | Yokoi ................. C09D 11/101 347/20 |
| 2017/0037269 A1 | | 2/2017 | Isobe |
| 2018/0251650 A1 | | 9/2018 | Xue et al. |

FOREIGN PATENT DOCUMENTS

| | | |
|---|---|---|
| JP | S53121896 A | 10/1978 |
| WO | WO1995027758 A | 10/1995 |
| WO | WO1997017409 A1 | 5/1997 |
| WO | WO2012024472 A1 | 2/2012 |
| WO | WO2018075065 A1 | 4/2018 |

* cited by examiner

100 ⟶ ejecting a non-aqueous ink composition onto a non-porous polymeric substrate, the non-aqueous ink compositing, comprising from 70 wt% to 98 wt% alcohol solvent, from 1 wt% to 6 wt% phenol-formaldehyde resin, from 1 wt% to 5 wt% tackifier, and from 1 wt% to 14 wt% organic solvent-soluble dye, wherein the tackifier includes a shellac having an acid number from 50 KOH/g to 100 mg KOH/g or a tackifier resin having an acid number from 100 mg KOH/g to 300 mg KOH/g ⟶ 102

NON-AQUEOUS INK COMPOSITIONS

BACKGROUND

Inkjet printing has become a popular way of recording images on various types of media. Some of the reasons include low printer noise, variable content recording, capability of high speed recording, and multi-color recording. These advantages can be obtained at a relatively low price to consumers. As the popularity of inkjet printing increases, the types of uses also increases providing demand for new ink compositions and applications.

DETAILED DESCRIPTION

Inkjet printing on non-porous polymeric substrates can present challenges due to the low surface energy of the substrate and because these types of substrates tend to resist fluid penetration. This can be particularly prevalent when the non-porous polymeric substrate has not first been surface treated to make the substrate more susceptible to ink adhesion. The term "untreated" indicates that a printing surface of a non-porous polymeric substrate has not been mechanically or chemically modified, such as by mechanical or chemical abrasion or by the application of a chemical ink receiving coating, for example. In some examples, the non-porous polymer substrates can be materials such as polyolefins, which lack functional groups that may otherwise aid in the adhesion of ink to the substrate. Printing solutions including the addition of volatile solvents and resins can be ineffective, whereas the use of high concentrations of resins with more aggressive solvents can provide some adhesion, but may tend to degrade the materials used to make the inkjet architecture operate properly and/or can lead to poor decap performance due to the high concentration of solids. On the other hand, with the inclusion of a certain class of resin as described in further detail herein, inkjet printing on non-porous polymeric substrates with low surface energy can occur with acceptable dry time, optical density, and durability, for example. In still further detail, by adding a small amount of a tackifier, further durability can be achieved. The tackifier can be a shellac having an acid number from 50 KOH/g to 100 mg KOH/g or a tackifier resin having an acid number from 100 mg KOH/g to 300 mg KOH/g.

In accordance with this, the present disclosure relates generally to a non-aqueous ink composition, a printing system, and a method of printing. In one example, the non-aqueous ink composition can include from 70 wt % to 98 wt % alcohol solvent, from 1 wt % to 6 wt % phenol-formaldehyde resin, from 1 wt % to 5 wt % tackifier, and from 1 wt % to 14 wt % organic solvent-soluble dye. The tackifier can be a shellac having an acid number from 50 KOH/g to 100 mg KOH/g, or can be a tackifier resin having an acid number from 100 mg KOH/g to 300 mg KOH/g. In one example, the tackifier is the shellac. In another example, the shellac can be a dewaxed shellac. The tackifier can be present in the non-aqueous ink composition at from 2 wt % to 3 wt % in another example. In still another example the non-aqueous ink composition can include from 0.1 wt % to 2 wt % of an amine compound. In another example, the non-aqueous ink composition can include from 0.1 wt % to 2 wt % surfactant selected from a nonionic surfactant, a perfluoropolyether surfactant, or a combination thereof. In further detail, the alcohol solvent can be, for example, methanol, ethanol, n-propanol, isopropanol, cyclopropanol, n-butanol, 2-butanol, isobutanol, tert-butanol, cyclobutanol, or a combination thereof. The phenol-formaldehyde resin can include a C3 to C8 alkyl-modified phenol-formaldehyde resin.

In another example, a printing system can include a non-aqueous ink composition and a non-porous polymeric substrate. The non-aqueous ink composition can include from 70 wt % to 98 wt % alcohol solvent, from 1 wt % to 6 wt % phenol-formaldehyde resin, from 1 wt % to 5 wt % tackifier, and from 1 wt % to 14 wt % organic solvent-soluble dye. The tackifier can be a shellac having an acid number from 50 KOH/g to 100 mg KOH/g, or can be a tackifier resin having an acid number from 100 mg KOH/g to 300 mg KOH/g. In one example, the non-porous polymer substrate can be untreated. In further detail, the non-porous polymer substrate can have a low surface energy, which can be defined as surface energies ranging from 18 mN/m to 35 mN/m. In other examples, the tackifier can include a shellac. In another example, the phenol-formaldehyde resin can include a C3 to C8 alkyl-modified phenol-formaldehyde resin.

In another example, a method of printing can include ejecting a non-aqueous ink composition onto a non-porous polymeric substrate. The non-aqueous ink composition can include from 70 wt % to 98 wt % alcohol solvent, from 1 wt % to 6 wt % phenol-formaldehyde resin, from 1 wt % to 5 wt % tackifier, and from 1 wt % to 14 wt % organic solvent-soluble dye. The tackifier can be a shellac having an acid number from 50 KOH/g to 100 mg KOH/g, or can be a tackifier resin having an acid number from 100 mg KOH/g to 300 mg KOH/g. In one example, the non-porous polymeric substrate can be untreated and can have a surface energy from 18 mN/m to 35 mN/m. In another example, the phenol-formaldehyde resin can include a C3 to C8 alkyl-modified phenol-formaldehyde resin and the tackifier can include a shellac.

It is noted that when discussing the non-aqueous ink composition, the printing system, and the method of printing, these various discussions can be considered applicable to other examples whether or not they are explicitly discussed in the context of that example. Thus, for example, in discussing an alcohol solvent related to a non-aqueous ink composition, such disclosure is also relevant to and directly supported in context of the printing system, the method of printing, vice versa, etc.

Turning now to certain specific compounds that can be present in the non-aqueous ink compositions, one component included is a phenol-formaldehyde resin, e.g., from 1 wt % to 6 wt % of a phenol-formaldehyde resin. The term "phenol-formaldehyde resin" is used herein to refer to a genus or series of resins that include alternating moieties of various phenols (modified or unmodified) and methylene (—$CH_2$-provided by the formaldehyde) groups, e.g., phenol-methylene-phenol-methylene, etc. One specific type of phenol-formaldehyde resin is a novolac resin that starts and ends the polymer chain with a phenol moiety (consuming the formaldehyde during polymerization and often leaving excess unreacted phenols in the reaction mixture. Phenol-formaldehyde resins can be linked together at the ortho position or the para position relative to the hydroxyl group positioned on the aromatic ring. Modification to the phenol group, e.g., a C3 to C8 alkyl group, can likewise typically be at the ortho or para position. To avoid confusion, the specific polymer species commonly referred to as "phenol-formaldehyde" is but one specific species of a phenol-formaldehyde resin as defined herein, e.g., the unmodified variety of the resin. Like any of the phenol-formaldehyde resins, they can have a variety molecular weight based on chain length, but in the case of modified phenol-formaldehyde resins, the molecular weight can also be increased per unit or "mer" along the polymer chain due to other side groups that are also positioned on the aromatic ring of the phenol in addition to the hydroxyl group. Thus, the term "phenol-formaldehyde resin(s)" refers to the genus of polymers that can be modified or unmodified at the phenol group, and the terms "phenol-formaldehyde" or "unmodified phenol-formaldehyde resin" refer more specifically to phenol-formaldehydes with only hydrogen at the remaining available ortho-, meta-, and para-positions (after polymerization).

An example of a commercially available phenol-formaldehyde resin that can be used in the ink compositions herein is REACTOL™ 1111E (LAWTER™, Inc., Illinois), which is non-reactive and highly soluble in C1-C4 alcohols, e.g., >1% solubility in ethanol. In one specific example, the phenol-formaldehyde resin can have a softening point temperature from 135° C. to 180° C., from 135° C. to 160° C., or from 140° C. to 170° C., for example, which can be established using the ASTM E28-14 protocol known as the "ring and ball" test. Phenol-formaldehyde resins exhibiting a softening point outside of this range can also be used. In further detail, the phenol-formaldehyde resin can be present in the ink composition at from 1.5 wt % to 5.2 wt %. In another example, the phenol-formaldehyde resin can be present in the ink composition at from 1 wt % to 4 wt %. In some examples, the phenol-formaldehyde resin can have a weight average molecular weight ranging from 1,000 Mw to 3,500 Mw, from 1,000 Mw to 3,000 Mw, from 1,000 Mw to 2,600 Mw, or from 1,800 Mw to 2,600 Mw. As phenol is aromatic, the phenol-formaldehyde resin includes aromatic moieties. In one example, the phenol-formaldehyde resin can be considered highly aromatic, which can be defined as including 85 wt % to 95 wt % or from 87 wt % to 93 wt % polymerized aromatic monomer. When the phenol-formaldehyde resin is a C3 to C8 alkyl-modified phenol-formaldehyde with the 1,000 Mw to 3,500 Mw range described above, the monomer weight can be from 87 wt % to 93 wt polymerized aromatic monomer, for example. It is noted that the phenol moiety can be modified with other groups other than C3 to C8 alkyl groups, e.g., alicyclic groups, oxygen-modified side groups, nitrogen-modified side groups, sulfur-modified side groups, etc. Additionally, the C3 to C8 alkyl group can be straight chained or branched. In one example, the C3 to C8 alkyl group can be at the para-position and can be branched, e.g., para-tert-butylphenol-formaldehyde and the polymerization can occur at the ortho position (both ortho positions occupied for polymerization except for at the end units where only one position may be occupied).

The phenol-formaldehyde resin can be a novolac resin. Novolac resins can be prepared without excess of formaldehyde so that formaldehyde is consumed during the polymerization process. Because the phenol groups react with the formaldehyde groups at typically the para- or ortho-position and not with other phenol groups, the polymer formed includes alternating phenol-containing units (formed from the phenol group) and —$CH_2$— units (formed from the formaldehyde). As all of the formaldehyde groups are consumed, the end units of the polymer can both be provided by the phenol-containing group, e.g., phenol-$CH_2$-phenol-$CH_2$-phenol-$CH_2$-phenol, etc., beginning and ending with phenol moieties. Thus, in one example, the phenol-formaldehyde resin can have a formaldehyde to phenol molar ratio of less than one. In other examples, excess formaldehyde that is not part of the resin can be excluded or essentially excluded from the ink composition, as it can be used up during the formation of the phenol-formaldehyde resin. Without the presence of excess formaldehyde, this can prevent the novolac resin from curing in the ink composition.

There are many phenol-formaldehyde resins that have a softening point lower than 135° C., and others that have a softening point within the 135° C. to 180° C. recited above, and still others with a softening point above 180° C. Various components used in preparing the phenol-formaldehyde resins can be selected, depending on what range of softening point may be indicated for a particular non-aqueous ink composition. For example, higher molecular weight polymers can be selected for use, modified phenol-formaldehyde resins can be selected for use, or both properties can be considered in selecting or preparing a phenol-formaldehyde resin for use in accordance with the present disclosure. For example, without limitation, a butylphenol formaldehyde polymer having a weight average molecular weight from about 1,800 Mw to 2,600 Mw can have a softening point from about 140° C. to about 150° C. The butylphenol formaldehyde can be, for example, a tert-butylphenol formaldehyde polymer, such as para-tert-butylphenol formaldehyde in one example. That being stated, the C3 to C8 alkylphenol formaldehyde, if used, can typically include an alkylphenol that is ortho (o-) or para (p-) relative to the hydroxyl group. If para, the formaldehyde polymerization can occur at the ortho position. If ortho, the formaldehyde polymerization can occur at either the other ortho position or at the para position.

Notably, other variables can also impact softening point, e.g., other than modification moieties, e.g., C3 to C8 alkyl, or polymer molecular weight. For example, other co-monomers can be copolymerized therewith and/or other additives or solvent may be used that may impact the nature of the polymer, including the softening point of the phenol-formaldehyde resin. As such, rather than identifying the various potential components that may impact the softening point of various phenol-formaldehyde resins that can be used in accordance with the present disclosure, phenol-formaldehyde resins can be selected based on softening point.

"Softening point" or "softening temperature" of polymers described herein can be determined using the American Society for Testing and Materials (ASTM) protocol E28-14, sometimes referred to as the "ring and ball test." Testing occurs by bringing the material above the softening point and stirring until melted, e.g., 75° C. to 100° C. above expected softening point. Two brass rings are heated to molten temperature and placed on a metal plate coated with dextrin and glycerin. The material is then placed on the rings, cooled for 30 minutes, excess material removed above the brass rings, and bathed in water 2 inches above the brass rings (starting at 5° C.). As the bath is warmed and stirred at a uniform rate, the material softens on the rings and two respective steel balls are placed on the polymer through the polymer material within the opening of the rings. The softening point is established by averaging the two temperatures recorded when the individual balls contact the metal plate.

The inclusion of a phenol-formaldehyde resin in the ink compositions described herein can benefit from the durability enhancement and dry time reduction when printed on a non-porous polymeric substrate. These benefits in combination were not found to be achievable with some other types of polymers, such as tosylamide-epoxy resin, ethylcellulose, polyvinyl-butyral resin, tosylamide-formaldehyde resin, or polyvinyl acetate, none of which resist removal from untreated biaxially oriented polypropylene non-porous substrates in response to surface rub that may be common when handling printed substrates. In one example, this durability enhancement provided by the phenol-formaldehyde resins may be attributable to non-covalent interactions between the phenol-formaldehyde resin and the non-porous media, such as hydrogen donation from the polymeric substrate, e.g., polyolefin, to an aromatic ring of a phenol-formaldehyde resin, which may result in the formation of C—H/π interactions.

The inclusion of certain types of phenol-formaldehyde resin can provide dry time reduction and printability benefits, and to some extent, can also provide some durability improvement when printed on non-porous polymeric substrates. This durability enhancement may be attributable to non-covalent interactions between the phenol-formaldehyde resin and the non-porous media, such as hydrogen donation from the polymeric substrate, e.g., polyolefin, to an aromatic ring of a phenol-formaldehyde resin, which may result in the formation of C—H/π interactions. However, though low levels of some alkyl-substituted phenol-formaldehyde resins, e.g., C4 alkyl group with a softening temperature from 135° C. or more, e.g., up to about 180° C. in some examples, can provide good durability, print quality, rapid dry time, more alcohol-soluble phenol-formaldehyde resins may not work as favorably with respect to durability, print quality, and dry time, e.g., 3-hydroxyphenol-formaldehyde resin or ortho-methylphenol-formaldehyde resin. The good solubility of these phenol-formaldehyde resins in an alcohol solvent allows the formulation of ink compositions with fast dry times. In combination with fast dry times, and in some cases acceptable durability, durability can be provided or enhanced by the addition of a small amount of a tackifier.

Thus, in accordance with examples of the present disclosure, in some instances, when only an alkylphenol-formaldehyde resin is used as the binder material, some ink compositions can fade at up to 90% (or more) when undergoing rub resistance testing (as set forth in the Example section herein), which is unacceptable. Fade resistance permitting fading up to 50%, 40%, 30%, or even 20% could be considered acceptable in some examples, whereas fade resistance with fade greater than about 50% may be considered unacceptable in these examples. To improve the rub resistance, the addition of a tackifier (in addition to the phenol-formaldehyde resin) can provide improved durability in non-aqueous, alcohol-based, ink compositions. In accordance with the present disclosure, a "tackifier" can be a tackifier resin or a shellac. Tackifiers can have a low-molecular weight, e.g., 3,000 Mw to 15,000 Mw; a high glass transition temperature, e.g., 23° C. to 150° C.; and a softening point above room temperature, e.g., above 23° C. Tackifiers can be referred to more specifically as resins or shellacs. To distinguish phenol-formaldehyde resins from other resins that are used as tackifiers, in some instances for clarity, these latter types of resins can be referred to as "tackifier resins" to distinguish them from the phenol-formaldehyde resins.

Example tackifier resins that can be used (which do not include the phenol-formaldehyde resin component that is also used) can include rosins, terpenes, alkyl hydrocarbon resins, e.g., C5 or C9 hydrocarbon resins, cycloaliphatic resins, aromatic resins, aliphatic and aromatic resins, hydrogenated hydrocarbon resins, or the like. More specific example tackifier resins that can be used include PENTALYN® 615M or PENTALYN® 670M (partially esterized fumaric adducts of rosin; AN 120 mg KOH/g or AN 176 mg KOH/g, respectively; Eastman Chemical, Tennessee), FILTREZ™ 521 (fumaric modified rosin esters; AN 217 mg KOH/g; Lawter, Inc., Illinois), REACTOL™ 5145 (polyester resins; AN 125 mg KOH/g; Lawter, Inc., Illinois); resorcinol-$CH_2O$ resin; rosin (derived from pine trees and various conifers with AN around 170 mg KOH/g, Mw ~300); or the like. Copal resin, for example, is a specific rosin that can be used that is derived from the Copal tree (*Protium copal*). The acid value range for the tackifier resins in particular can be from 100 mg KOH/g to 300 mg KOH/g, from 100 mg KOH/g to 250 mg KOH/g, or from 120 mg KOH/g to 220 mg KOH/g. The tackifier resin that can be used is not particularly limited, provided it has an acid number in the above-identified range. Thus, tackifier resins can include, for example, polyamides, phenolic resins, unmodified rosins (rosin and copal), to name a few.

"Acid number" (or add value) refers to the mass of potassium hydroxide (KOH) in milligrams that can be used to neutralize one gram of tackifier (mg KOH/g). This value can be determined, in one example, by dissolving or dispersing a known quantity of the tackifier (shellac or tackifier resin) in organic solvent and then titrating with a solution of potassium hydroxide (KOH) of known concentration for measurement.

Shellacs, on the other hand, are particularly useful in enhancing the durability of non-aqueous ink compositions with phenol-formaldehyde resins, and in many cases work better for enhancing durability than many tackifier resins described above. Shellacs, which are produced from "lac" secretions of insects associated with host trees (unlike tackifier resins that are plant-based), are often commercially available and generically marketed without differentiation, even though there are differences in shellacs based on various attributes, e.g., insect strains, host trees, refining methodology, etc. A few example insect strains and host trees include the Kerria Lacca (Kerr) Lindiger (Coccideae) associated with several different trees in Asia, the Kushmi strain insects associated with the Kusum tree (*Schleichera oleosa*), the Rangeeni strain-insects (Bysakhi) associated with Palas (*Butea monosperma*) and Ber (*Zizyphus mauritiana*) trees, or the *Laccifer chinensis* (Madihassan) insects associated with the Raintree (*Samanea saman*). These different insects and tree hosts produce different types of "lac" material as a starting material for producing shellac. Once the "seedlac" is collected (scraped) from the tree it was produced on, it is refined from one of a few processes. Refining methodologies include the melting process, the bleaching process, and the solvent extraction process. In just a few examples, the melting process can produce "orange shellac," the bleaching process can produce "refined bleached shellac," and the solvent extraction process can produce dewaxed orange shellac. These and other types of shellac may include nomenclature representative of their individual chemical composition, properties, color, insect, host tree, methodology of refining, etc. Others use tradenames as identifiers that may not be as descriptive. Example shellacs that are commercially available that can be used include, without limitation, SSB 55 (Stroever GmbH & Co. KG, Germany, Kushmi seedlac, solvent extraction), SSB 57-Ber (Stroever GmbH & Co. KG, Germany, Bysakhi-Ber seedlac, solvent extraction), SSB 57-Palas (Stroever GmbH & Co. KG, Germany, Bysakhi-Palas seedlac, solvent extraction), SSB 61 (Stroever GmbH & Co. KG, Germany, Thai seedlac, solvent extraction), Pearl-N811F (Gifu Shellac Mfg. Co., Ltd., Japan, Thai seedlac, solvent extraction), Pearl-N811Ph (Gifu Shellac Mfg. Co., Ltd., Japan, Thai seedlac, solvent extraction), Dreiring Pharma (Stroever GmbH & Co. KG, Germany, Thai seedlac, bleaching process), Shellac DBL (Tajna River Ind. Pvt. Ltd., India, Indian seedlac, bleaching process), or AT 10-1010 (Hindustan Shellac Pvt. Ltd., India, Kushmi, solvent extraction). Any of these shellacs can be used in accordance with examples of the present disclosure, as well as others. For example, one type of shellac that can be used can be referred to as a dewaxed shellac. In another example, the shellac can be a shellac with very light coloration, e.g., Super Blonde shellac. In another example, the shellac can be a dewaxed Super Blonde shellac. Coloration values can be further used to characterize shellacs that can be used in accordance with the present disclosure.

With these examples provided, as shellacs are a fairly complicated mixture of mainly aliphatic and alicyclic acid components, insect strain/tree host and refining method can produce noticeable variations. Thus, color numbers can be used to define grades in some examples, and in further detail, glass transition temperatures (Tg), and/or acid numbers (mg KOH/g) can assist with differentiating bleached and unbleached shellac grades as well as food and pharma grades, etc. An example color number measurement (and scale) that can be used for shellacs is the Gardner Color (GC) number scale, with values for the shellacs of the present disclosure ranging from 4 to 16, from 4 to 14, from 4 to 13, from 5 to 13, or from 6 to 13, from 6 to 12, from 6 to 11, for example. Some example shellacs can be characterized based on a maximum allowable Gardner Color number, as follows: Platina (GC 8), Super Blonde (GC 11), Blonde (GC13), Dewaxed Lemon (GC 15), Dewaxed Orange (GC 16), Dewaxed Garnet (Dark, GC scale). Example glass transition temperatures for shellacs can be, for example, from 35° C. to 55° C., from 35° C. to 52° C., or from 37° C. to 49° C. Acid numbers can range from 50 mg KOH/g to 100 mg KOH/g, from 60 mg KOH/g to 100 mg KOH/g, from 60 mg KOH/g to 90 mg KOH/g, from 67 mg KOH/g to 93 mg KOH/g, or from 71 mg KOH/g to 79 mg KOH/g.

Color number values can be determined and compared to the Gardner Color number scale using the color tester Lico 50 (Dr. Lange GmbH, Germany) in 11-mm cylindrical glass cuvettes. The measuring principle is photometric where fraction filtered light is transmitted through the sample and measured by photosensors in comparison to a reference beam. To prepare the samples for measurement, they are dissolved in 96 vol % ethanol at a concentration of 20% (m/V). The color standards of the Gardner Color number scale ranges from white through yellow and then to deep amber, with a range of color values from 1 to 18. These reference colors are compared to the shellac dilutions at 25° C. and given a number value based on similarity to the Gardner Color number. In a more detailed example, Gardner Color numbers can be measured by a dual beam xenon flash spectrophotometer, for example the ColorQuest® XT (HunterLab, USA).

Glass transition temperature (Tg) can be analyzed using a DSC 30 and Graphware software (both from Mettler Toledo, USA), and the equipment can be calibrated against indium as temperature and enthalpy standard. The various samples (9-10 mg) can be weighed into a 30-μL aluminum pan, the caps perforated once, and the samples directly measured. The samples can be heated at 10° C./min from −30° C. up to 200° C. with 80 mL/min of nitrogen purge. Glass transition temperatures (Tg) are determined based on the turning point of the curve progression.

In some examples, the weight average molecular weight of the shellacs can be from about 3,000 Mw to about 15,000 Mw, or from about 5,000 Mw to about 10,000 Mw, with a number average molecular weight ranging from about 1,500 Mn to about 5,000 Mn. "Number average molecular weight" or "Mn" is the weight at which there are an equal number of molecules above and below the value given. The polydispersity can be from about 1.5 to about 5, or about 2 to about 4, for example, which causes the weight average molecular weight (Mw) to be skewed upward due to the presence of some high molecular weight polymers that may be present.

In accordance with this, tackifier resins (other than the phenol-formaldehyde resin) as well as various shellac tackifiers, can enhance adhesion between the ink compositions of the present disclosure when printed on non-porous polymeric substrates, even some of the more challenging biaxially oriented poly(C2-C5)alkylene substrates, e.g., biaxially oriented polypropylene. For example, from 1 wt % to 5 wt % tackifier added to a non-aqueous, alcohol-based, ink composition with a phenol-formaldehyde resin can provide rub resistance, defined in terms of fraction fade, which is acceptable. "Fraction fade" can be defined as a fraction (0 to 1) or percentage to denote how much of the ink can be rubbed from the printed surface using a predefined printing and rubbing protocol. Thus, the lower the fraction or percentage value, the better. In the non-aqueous ink compositions of the present disclosure, in some examples, when from 1 wt % to 5 wt % of tackifier is added, a fraction fade from about 10% to about 50% (or about 0.1 to about 0.5) can be achieved. With the range from about 2 wt % to 4 wt % tackifier, the fraction fade can be from about 10% to about 30%. If the goal of fraction fade is to only lose 30% of the printed image from rub resistance testing, this can be achieved at about 2 wt % in one example, with the maximum rub resistance occurring at about 4 wt %, for example. Thus, alternative ranges of tackifier that can be added can be from 1.75 wt % to 5 wt %, from 1.75 wt % to 4.25 wt %, from 2 wt % to 5 wt %, or from 2 wt % to 4 wt %. These ranges can depend on the other components added, such as the amount of phenol-formaldehyde resin, but these ranges can provide reasonable concentrations where durability of printed images can be enhanced without too much tackifier being added that may otherwise interfere significantly with printability, e.g., decap, kogation, etc. If printability starts to become problematic at the margins or becomes problematic with respect to the production of a commercially viable product, there are additives that can be included that may assist with printability, as discussed in further detail hereinafter. In further detail regarding durability, the addition of the tackifier without the addition of the phenol-formaldehyde resin does not seem to provide as much adhesion as the combination of the two components together in a common ink composition. The opposite is also true, where the addition of the phenol-formaldehyde resin does not seem to provide the same durability benefits as both compounds when added together. Regardless of durability, this combination of components, e.g., alcohol solvent, tackifier, phenol-formaldehyde resin, provide excellent dry times, e.g., less than about 3 seconds, less than about 4 seconds, less than about 5 seconds, less than about 8 seconds, or less than about 10 seconds.

As mentioned, the non-aqueous ink composition can include an alcohol solvent, which is the primary solvent vehicle component, making up 70 wt % or more of the total non-aqueous ink composition. Thus, the "non-aqueous ink compositions" of the present disclosure can be likewise referred to as "alcohol-based ink compositions." It should be noted that the term "non-aqueous" indicates that the ink compositions do not include water for purposes of providing a solvent vehicle for the non-aqueous ink composition as a whole. If some small amount of water is included in the non-aqueous ink compositions of the present disclosure, such as may be the case when brought in with another component, e.g., brought in with added surfactant or other additive or component, then such ink compositions are still considered to be "non-aqueous." For further clarity, if less than about 5 wt %, or more typically, less than about 2% or even less than about 1 wt %, of water is present, the ink composition is still considered to be a "non-aqueous ink composition."

In one example, the alcohol solvent can be present in the formulation at from 70 wt % to 98 wt %, from 75 wt % to 85 wt %, from 80 wt % to 90 wt %, from 70 wt % to 80 wt %, or from 90 wt % to 98 wt %. The alcohol can serve as the primary solvent in the composition and can decrease dry time of a printed article created with the ink compositions and non-porous polymeric substrates of the present disclosure. In one example, the alcohol solvent can include a C1 to C4 alcohol. These alcohols can include methanol, ethanol, n-propanol, isopropanol, cyclopropanol, butanol, n-butanol, 2-butanol, isobutanol, tert-butanol, cyclobutanol, or mixtures thereof. C1 to C4 alcohol solvents used herein, for example, can be less aggressive than other types of solvents and may not degrade materials often found in inkjet architecture. C1 to C4 alcohols can also improve dry time and provide enhanced solubility of various components. In some examples, the alcohol solvent can be denatured. In other examples, the alcohol solvent can be a straight chain alcohol. In other examples, the alcohol solvent can be branched, e.g., isopropanol or one of the branched butanols. In one example, the alcohol solvent can include ethanol. In yet another example, the alcohol solvent can include n-propanol.

The non-aqueous ink compositions can further include from 1 wt % to 14 wt % of an organic solvent-soluble dye. As used herein, "organic solvent-soluble dye" refers to a dye that is soluble in an organic solvent or co-solvent, e.g., the alcohol solvent and/or co-solvent. The organic solvent-soluble dye can be soluble in either or both types of solvent (alcohol solvent and/or organic co-solvent) prior to mixing together or after mixing together, depending on the methodology. The organic solvent-soluble dye can be present in the ink composition at from 3 wt % to 12 wt % or from 5 wt % to 10 wt %. In some examples the organic solvent-soluble dye can be a black dye. Other colors can include cyan dye, magenta dye, yellow dye, orange dye, red dye, pink dye, blue dye, violet dye, green dye, brown dye, etc. In other examples, a combination of organic solvent-soluble dyes can be incorporated into the ink composition. For example, the organic solvent-soluble dye could be the combination of a black dye and an orange dye, which can be included to provide a more neutral black ink color.

Commercially available organic solvent-soluble dyes can include BASONYL® blue 636, ORASOL® black X55, ORASOL® black SBK28, ORASOL® black SBK27, ORASOL® black SBK29, ORASOL® blue 825, ORASOL® blue 855, ORASOL® orange 247, ORASOL® orange 251, ORASOL® orange 272, ORASOL® orange 347, ORASOL® pink 478, ORASOL® red 330, ORASOL® red 355, ORASOL® red 363, ORASOL® red 365, ORASOL® red 395, ORASOL® red 471, ORASOL® yellow 075, ORASOL® yellow 152, and ORASOL® yellow 157 all available from BASF, Germany; MORFAST® brown 100 and NAVIPON® violet 9 available from Sunbelt Corporation, South Carolina; ORASOL® yellow 2RLN available from Ciba Specialty Chemicals, Switzerland; SAVINYL® black RLSN, SAVINYL® blue RS, and SAVINYL® red 3GLS all available from Clariant Ltd, Texas; and VALIFAST® black 3804, VALIFAST® black 3807, VALIFAST® black 3820, VALIFAST® black 3830, VALIFAST® black 3840, VALIFAST® black 3866, VALIFAST® black 3870, VALIFAST® blue 1605, VALIFAST® blue 1613, VALIFAST® blue 1621, VALIFAST® blue 1631, VALIFAST® blue 2606, VALIFAST® blue 2620, VALIFAST® blue 2670, VALIFAST® brown 2402, VALIFAST® brown 3402, VALIFAST® brown 3405, VALIFAST® green 1501, VALIFAST® orange 1201, VALIFAST® orange 2210, VALIFAST® orange 3208, VALIFAST® orange 3209, VALIFAST® orange 3210, VALIFAST® pink 2310N, VALIFAST® pink 2312, VALIFAST® red 1308, VALIFAST® red 1320, VALIFAST® red 1355, VALIFAST® red 1364, VALIFAST® red 1388, VALIFAST® red 2303, VALIFAST® red 2320, VALIFAST® red 3304, VALIFAST® red 3306, VALIFAST® red 3311, VALIFAST® red 3312, VALIFAST® red 3320, VALIFAST® violet 1701, VALIFAST® violet 1704, VALIFAST® yellow 1101, VALIFAST® yellow 1109, VALLIFAST® yellow 109, VALLIFAST® yellow 1151, VALLIFAST® yellow 1171, VALLIFAST® yellow 3108, VALLIFAST® yellow 3120, VALLIFAST® yellow 3150, VALLIFAST® yellow 3170, VALLIFAST® yellow 3180, VALLIFAST® yellow 4120, and VALLIFAST® yellow 4141 all available from Orient Chemical Industries, California.

In some examples, the ink composition can further include other solid or liquid components. For example, the ink composition can further include from 2 wt % to 12 wt % of an organic co-solvent (other than the alcohol solvent component). In yet other examples, the composition can include from 3 wt % to 9 wt % organic co-solvent, or from 4 wt % to 11 wt % organic co-solvent. In one example, the organic co-solvent can include C4 to C8 aliphatic hydrocarbon chain(s). To illustrate using hexane as an example, the hexane can be n-hexane, a branched isomer thereof, or a mixture of hexane isomers. Isomers of hexane can include, for example, n-hexane, cyclohexane, and branched hexane isomers (2-methylpentane; 3-methylpentane; 2,3-dimethylbutane; 2,2-dimethylbutane, etc.). The organic co-solvent can include a carbonyl functional group, a ketone functional group, an ester functional group, or a combination thereof. The co-solvent may likewise include ethyl acetate or acetone, for example. These solvents can be useful for purposes of printability generally, but in some examples, they can be used to assist with solubilizing a perfluoropolyether surfactant, if such a compound is added to the non-aqueous ink compositions of the present disclosure.

Thus, in one example, the non-aqueous ink compositions can include from 0.05 wt % to 1 wt % (or alternatively from 0.05 wt % to 0.9 wt %, from 0.05 wt % to 0.8 wt %, or from 0.1 wt % to 0.8 wt %) of a perfluoropolyether. Alternatively or additionally, the non-aqueous ink compositions can include non-ionic surfactant(s) as described in greater detail hereinafter. Perfluoropolyethers can have a positive impact on decap performance and can also reduce ink puddling when dispensing solvent-based inks that are described herein. For example, by adding a perfluoropolyether to non-aqueous ink compositions with alcohol solvent, organic solvent-soluble dye, and a phenol-formaldehyde resin as set forth herein can improve decap performance substantially in some examples. For example, decap performance at 15 minutes for an ink composition with even a small amount of added perfluoropolyether in some instances can outperform similar non-aqueous ink compositions without the perfluoropolyether at as short as 10 seconds.

In one specific example, the perfluoropolyether can be a dialkyl amide perfluoropolyether, e.g., a perfluoropolyether backbone with ends functionalized with an alkyl amide group. A commercially available example of a dialkyl amide perfluoropolyether is FLUOROLINK® A10 or A10P (the pelletized version of A10), available from Solvay (Belgium). In some examples, perfluoropolyethers can benefit from the presence of a perfluoropolyether-dissolving organic co-solvent (or "dissolving co-solvent"), such as from 2 wt % to 12 wt % of hexane, ethyl acetate, acetone, or a combination thereof. Other dissolving co-solvents can be used as well. The perfluoropolyether can be admixed/dissolved in the dissolving co-solvent prior to admixing with the alcohol solvent and the phenol-formaldehyde resin, for example, or it can be admixed after the alcohol solvent is present.

One example, as mentioned previously as a dialkyl amide perfluoropolyether, can have number-average molecular weight from 400 daltons to 4,000 daltons. One example structural formula can be represented as Formula I, as follows:

Formula I where X can be —CONH—($C_9$ to $C_{32}$ alkyl), e.g., $C_{18}H_{37}$, n can be from 1 to 53, and m can be from 31 to 1, for example. The $C_9$ to $C_{32}$ alkyl group can be different for the X on individual ends of the polymer. Furthermore, the $C_9$ to $C_{32}$ alkyl can be straight-chained or branched. In some examples, shorter or longer dialkyl amide perfluoropolyether chains can be used, but in more specific examples, m and n can be such that the number-average molecular weight can be from 1,200 daltons to 2,300 daltons, from 1,200 daltons to 2,000 daltons, from 2,000 daltons to 2,500 daltons, 2,100 daltons to 2,300 daltons, etc.

To the extent that the added phenol-formaldehyde resin and the tackifier start to interfere with decap, kogation, or other printability performance properties, various additives that promote improved decap, kogation, etc., can be included. For example, the perfluoropolyether surfactant described above can contribute to improving printing performance. On the other hand, other surfactants can also or alternatively be added to assist with printability issues. For example, nonionic surfactants can be used to improve decap performance that may be reduced by the addition of the durability enhancing phenol-formaldehyde resin and tackifier. A nonionic secondary alcohol ethoxylate, such as Tergitol™ 15-S-7 (from Dow Chemical, USA), and/or a nonionic acetylenic surfactants such as Surfynol® 465 (from Evonik, Germany), can be used to provided good decap performance in non-aqueous ink formulations, with decap performance often exceeding 5 minutes, or even 15 minutes of decap time. Without the addition of a surfactant (or multiple surfactants in some instances), less than 60 seconds of decap time may be more typical. The surfactant component (total of all surfactant content including perfluoropolyether content, nonionic surfactant content, and any other surfactant content that may be present) can be added to concentrations suitable for improving decap performance while not impacting dry time too negatively, e.g., not more than tripling dry time or not more than doubling dry time compared to an ink identically formulated but without the added surfactant. Suitable surfactant concentrations that can be present in the non-aqueous ink compositions of the present disclosure can be from 0.1 wt % to 2 wt %, or from 0.1 wt % to 1.5 wt %, or from 0.15 wt % to 1 wt %, for example.

With respect to ameliorating kogation in the non-aqueous ink compositions of the present disclosure, particularly when the tackifier used is a shellac, there can also be an added benefit of adding an amine compound at a relatively small quantity, e.g., from 0.1 wt % to 2 wt %, from 0.1 wt % to 1.5 wt %, from 0.2 wt % to 1.5 wt %, from 0.25 wt % to 1 wt %, etc. Particularly with thermal inkjet printing, momentary temperatures at fluidic surfaces at the thermal inkjet resistor can get to about 500° C. or more in some instances. Shellacs can be further polymerized when exposed to temperatures around 120° C. or so, depending on the specific shellac. Thus, particularly at the resistor, which is the component that initiates thermal ink ejection through the nozzle, shellacs can start to polymerize further and grow and adsorb onto surfaces immediately at the resistor area. The deposition can lead to the resistor ceasing to function properly after operating for a short while, e.g., 500,000 firings. That stated, with piezo inkjet printheads where ink firing is not temperature dependent, this type of kogation may not occur and thus, these inks can work well even longer with piezo-actuated inkjet printheads. With more specific respect to thermal inkjet ejection, though the non-aqueous ink compositions can be useable for a reasonable amount of time before kogation starts to cause printing issues, printhead life can be significantly extended by ameliorating shellac polymerization and deposition at the resistor. Additives, such as amines, e.g., alkyl amines, can be included to prevent significant polymerization of the shellac that may be present therein. Amines are added because they tend to resist heat-induced polymerization of the shellacs, potentially because they form an ammonium salt that may inhibit reaction and/or may remove an acid from the system, thus starving the shellac of its acid catalyzed polymerization chemical mechanism. Example amine compounds that can be used include C3 to C25 alkyl amines, including straight-chained or branched alkyl amines, C6 to 25 alicyclic amines (including alicyclic amines with alkyl group), C6 to C25 aromatic amines (including aromatic amines with alkyl groups), or the like. The amine compounds can be saturated or unsaturated. Specific example alkyl amine compounds that can be used include n-dodecylamine (straight-chain alky amine), isopropylamine (branched alkyl amine), oleylamine (unsaturated straight-chain alkyl amine), 2-ethyl-1-hexylamine (branched alkyl amine), or the like.

Turning to the non-porous polymeric substrate, the term "non-porous" does not infer that the substrate is devoid of any and all pores in every case, but rather indicates that the substrate does not permit bulk transport of a fluid through the substrate. In some examples, a non-porous substrate can permit very little water absorption, at or below 0.1 vol %. In yet another example, a non-porous substrate can allow for gas permeability. In one example, however, a non-porous substrate can be substantially devoid of pores. In another example, the non-porous polymeric substrate can be uncoated or without surface treatment. Non-porous substrates can be continuous non-fibrous structures. Non-limiting examples of non-porous polymeric substrates include polyvinyl chloride, polyethylene, low density polyethylene (density less than 0.93 g/cm³), high density polyethylene (density from 0.93 g/cm³ to 0.97 g/cm³), polyethylene terephthalate, polypropylene, polystyrene, polylactic acid, polytetrafluoroethylene (e.g., TEFLON® from the Chemours Company), or blends thereof. In some examples, the non-porous polymeric substrate can be a biaxially-oriented substrate. In a more specific example, the non-porous polymeric substrate can be a biaxially-oriented polypropylene film.

In one example, the non-porous polymeric substrate can be "untreated," which includes both a lack of any chemical treatment, etching, coating, etc., as well as a lack of any specific mechanical treatment to modify the surface thereof, such as patterning, roughening, etc., in order to make the non-porous polymeric substrate more receptive to the ink composition. Furthermore, when referring to "untreated" substrates, this can also include non-porous polymeric substrates that can lack functional groups at a print surface that can aid in adhesion of ink to the substrate. For example, the non-porous polymeric substrate can be a polyolefin, such as a polyethylene or a polypropylene. In another example, the non-porous polymeric substrate can be a biaxially oriented polyolefin, such as a biaxially oriented polypropylene or other polyolefin. In another example, the non-porous polymeric substrate can be a polytetrafluoroethylene (e.g., TEFLON® from the Chemours Company). Polymer blends of these and other materials can also be used. If "untreated," these materials can be unmodified chemically and/or mechanically at a surface of the substrate as well as unmodified along the polymer chain of the material at the surface.

In some examples, the non-porous polymeric substrate can also have low surface energy. For example, the substrate can have a surface energy ranging from 18 mN/m to 35 mN/m. In yet other examples, the substrate can have a surface energy ranging from 20 mN/m to 30 mN/m or from 25 mN/m to 35 mN/m. When untreated, in particular, the lack of functional groups along the polymer, the lack of surface modification of the substrate, and the low surface energy of the print surface can make this type of substrate difficult to print upon, as most ink compositions do not adhere well thereon.

"Surface energy" can be evaluated and quantified using contact angle measurement (goniometry) of a liquid applied to the surface of the polymer. The device used for taking the static contact angle measurement can be an FTA200HP or an FTA200, from First Ten Angstroms, Inc. (USA). For example, Young's equation ($\gamma = \gamma_{sl} + \gamma_{lv} \cos \theta$; where $\theta$ is the contact angle, $\gamma$ is the solid surface free energy, $\gamma_{sl}$ is the solid/liquid interfacial free energy, and $\gamma_{lv}$ is the liquid surface free energy) can be used to calculate the surface energy from measured contact angle using a dyne fluid, e.g., water. However, in some instances where water is not a good dyne fluid for a particular test, other fluids, such as methylene iodide, ethylene glycol, formamide, etc., can be used to probe the surface generally or to probe different types of surface energy components while avoiding fluids that may dissolve or absorb into the surface. With polymer or non-porous substrates of the present disclosure, the dyne fluid selection generally provides very similar results that may be averaged to the extent there is some degree of different data. In addition to these considerations, dyne fluids can be with known surface tension properties in a controlled atmosphere. In other words, by using dyne fluid(s) (liquid) and atmosphere (gas) with known free energies, and by measuring the contact angle (acute angle between the flat surface and the relative angle at the base of liquid where it contacts the flat surface) of the liquid bead on the polymer surface, these three pieces of data can be used with Young's equation to determine the surface energy of the polymer surface.

Figure 1:
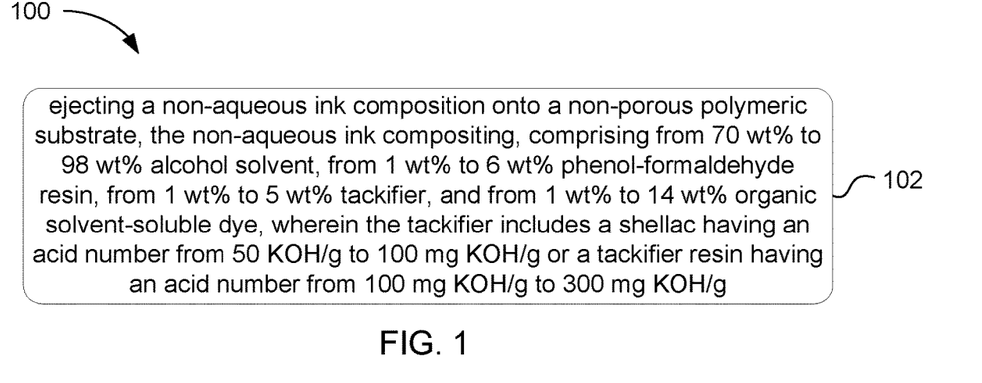
FIG. 1 is a block diagram depicting an example method of printing in accordance with the present disclosure.

In further detail, and as shown in FIG. 1, a method 100 of printing can include ejecting 102 a non-aqueous ink composition onto a non-porous polymeric substrate. The non-aqueous ink composition can include from 70 wt % to 98 wt % alcohol solvent, from 1 wt % to 6 wt % phenol-formaldehyde resin, from 1 wt % to 5 wt % tackifier, and from 1 wt % to 14 wt % organic solvent-soluble dye. The tackifier can be a shellac having an acid number from 50 KOH/g to 100 mg KOH/g or a tackifier resin having an acid number from 100 mg KOH/g to 300 mg KOH/g. In one example, the non-porous polymeric substrate can be untreated and can have a surface energy from 18 mN/m to 35 mN/m. In another example, the phenol-formaldehyde resin can include a C3 to C8 alkyl-modified phenol-formaldehyde resin and a shellac.

It is noted that, as used in this specification and the appended claims, the singular forms "a," "an," and "the" include plural referents unless the content clearly dictates otherwise.

As used herein, "decap" refers to the ability of a non-aqueous ink composition to readily eject from a print head upon prolonged exposure to air. For example, decap can refer to the amount of time that a print head may be left uncapped before the printer nozzle no longer fires properly, potentially because of clogging or plugging, e.g., 5 second decap, 60 second decap, 5 minute decap, 15 minute decap, 1 hour decap, etc. If a nozzle has become clogged, ink droplets ejected through the nozzle's orifice may be misdirected, which may adversely affect print quality. Thus, decap performance can be evaluated by printing sample print plots including various types of "fill," such as solid fill, fine lines, grids, etc.

The term "kogation" refers to the firing actuator of an inkjet printhead that ceases to function properly as evidenced by a reduction in the nozzle firing (not due to clogging). Kogation tends to be more related to the firing element, e.g., the thermal resistor in inkjet printheads. In accordance with the present disclosure, kogation may be due to a build up of ink component residue at the firing element resulting in little or no (weak) ink drop discharged from the fluid ejector. The residue on the printhead can be from any of a number of components that may be present in the ink, but alcohol-insolubilized shellac and/or occluded dye may both contribute to this issue in the non-aqueous ink compositions of the present disclosure.

As used herein, a "biaxially-oriented" substrate refers to a substrate that has a stretched crystal or structural orientation in at least two directions or axes. This process can generate non-porous polymeric films that can have a higher tensile strength (per given thickness), greater stiffness, enhanced fluid barrier, etc. Biaxially-oriented substrates can have less permeability and can thereby limit diffusion compared to other types of substrates. Because these substrates tend to have enhanced fluid barrier properties, printing on biaxially-oriented substrates can be particularly challenging in some examples.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of 1 wt % to 20 wt % should be interpreted to include not only the explicitly recited limits of 1 wt % and 20 wt %, but also to include individual weights such as 2 wt %, 11 wt %, 14 wt %, and sub-ranges such as 10 wt % to 20 wt %, 5 wt % to 15 wt %, etc.

EXAMPLES

The following illustrates examples of the present disclosure. However, it is to be understood that these examples are only illustrative of the principles set forth herein. Numerous modifications may be devised without departing from the disclosure teachings. The appended claims are intended to cover such modifications. Thus, while the technology has been described above with particularity, the following provides further detail in connection with what are presently deemed to be the acceptable examples.

Example 1—Non-Aqueous Ink Compositions with Phenol-Formaldehyde Resin and/or Tackifier and Print Durability on Non-Porous Biaxially-Oriented Polypropylene Substrates Several different non-aqueous ink compositions were formulated. A dialkyl amide perfluoropolyether was dissolved in ethyl acetate, though other perfluoropolyether-dissolving co-solvent can alternatively be used, e.g., cyclohexanone, acetone, etc. Ethanol was then added, followed by the addition of a phenol-formaldehyde resin and the tackifier, and lastly the dye to generate the various non-aqueous ink compositions. The general liquid vehicle components are shown in Table 1, and the various phenol-formaldehyde resin and tackifier concentrations are shown in Table 2, as follows:

TABLE 1

Non-Aqueous Ink Compositions

| Component | Type | Wt % |
|---|---|---|
| Ethanol (less added phenol-formaldehyde resin and tackifier) | Alcohol solvent | 86.3 |
| Ethyl acetate | Perfluoropolyether-dissolving co-solvent | — |
| FLUOROLINK ® A10P | Dialkyl amide perfluoropolyether | 0.3 |
| REACTOL ™ 1111E* | Phenol-formaldehyde resin | 0-3.6* |
| Shellac or Tackifier resin* | Tackifier | 0-5* |

*See Table 2

FLUOROLINK ® is available from Solvay, Belgium.
REACTOL ™ is available from Lawter, Inc., Illinois.

TABLE 2

Fraction Fade as Function of Phenol-formaldehyde Resin and Tackifier Added in Non-aqueous Ink Vehicle of Table 1 formulated with solvent soluble dye**

| REACTOL ™ 1111E (wt %) | Tackifier Resin ID | Tackifier Resin (wt %; mg KOH/g) | Tackifier Shellac (wt %; mg KOH/g) | Fraction Fade |
|---|---|---|---|---|
| — | — | — | 2.5/71-79 | 1 |
| 1.8 | FLEX-REZ ™ 1084 | 1; AN 20 | — | 0.56 |
| 1.8 | — | — | 2.5/71-79 | 0.21 |
| 1.8 | FLEX-REZ ™ 1084 | 1; AN 20 | 2.5/71-79 | 0.23 |
| 1.8 | — | — | 5/71-79 | 0.17 |
| 3.6 | — | — | — | 0.67 |
| 3.6 | — | — | 2.5/71-79 | 0.18 |
| 3.6 | — | — | 5/71-79 | 0.23 |
| 3.6 | PENTALYN ® 615M | 1; AN 120 | — | 0.7 |
| 3.6 | PENTALYN ® 670M | 1; AN 176 | — | 0.46 |
| 3.6 | FILTREZ ™ 521 | 1; AN 217 | — | 0.42 |
| 3.6 | REACTOL ™ 5145 | 1.2; AN 125 | — | 0.45 |
| 3.6 | Rosin | 4; AN ~170 | — | 0.4 |
| 3.6 | Copal Resin | 4; AN ~170 | — | 0.44 |

**Solvent-soluble dye was 5.9 wt % VALIFAST ® 3808 from Orient Chemical Industries, California. [DID YOU USE THE 0.9 wt % ORASOL ® 247 available from BASF, Germany IN THIS EXAMPLE?]
Shellac is Dewaxed Super Blonde Shellac available from Shellac Shack, Oregon.
REACTOL ™, FLEX-REZ ™, and FILTREZ ™ are available from Lawter, Inc., Illinois.
PENTALYN ® is available from Eastman Chemical, Tennessee.

Fraction fade was evaluated using a rub-tester, TMI® (Testing Machines Inc., New York) model #10-1801-0001 that was fitted with a blue latex glove having one drop squalene oil applied at the tip. Each print was rubbed 24 times in three spots at a pressure of 30 psi. The prints were then scanned using an EPSON® V5000 Office Scanner (Seiko Epson Corp., Japan) and the percent fade was calculated by dividing the optical density of the rubbed area by the optical density of the areas that were not rubbed. The percent fade was calculated using QEA® IAS 2000-D software (Quality Engineering Associates, Inc., Massachusetts).

As can be seen from Table 2, acceptable results can often be achieved with respect to fraction fade durability when using most of the resin tackifiers at 1 wt %, e.g., less 0.5 or less, with marginally improved results at 4 wt %, e.g., about 0.4 fraction fade with the rosin and 0.44 fraction fade with the Copal resin. The resin tackifier that produced results above 0.5 fraction fade was FLEX-REZ™ 1084 (polyamide resin; AN 20 mg KOH/g) at 0.56 fraction fade, which is considered unacceptable. However, when combined with the shellac tackifier (71-79 mg KOH/g), the performance was brought to 0.23 fraction fade, which is considered excellent durability. Thus, the acid number of the tackifier appears to have an impact on durability performance. In further detail, in every case that used only 2.5 wt % shellac (again with the phenol-formaldehyde resin in combination), the fraction fade was universally brought below 0.3, which is excellent fraction fade, particularly compared to the use of shellac tackifier alone (fraction fade 1) and phenol-formaldehyde resin along (fraction fade 0.67). Thus, combining any of the above tackifiers with the phenol-formaldehyde resin generated improvements, with the most significant improvements with respect to durability found with the shellac tackifiers.

Figure 2:
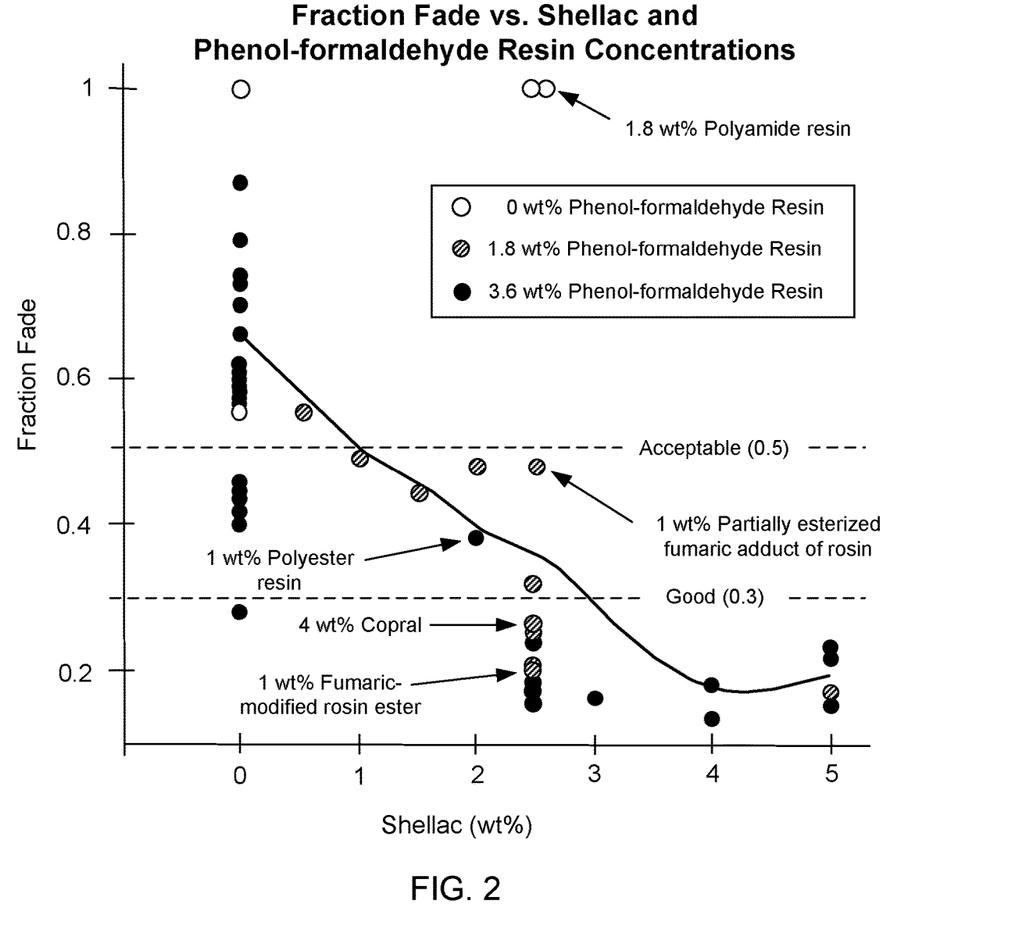
FIG. 2 graphically presents example fraction fade data for various non-aqueous ink compositions printed and evaluated for rub resistance in a non-porous polymeric substrate in accordance with the present disclosure.

Example 2—Non-Aqueous Ink Compositions with Phenol-Formaldehyde Resin and/or Shellac and Print Durability on Non-Porous Biaxially-Oriented Polypropylene Substrates As a result of the positive durability results for shellacs combined with phenol-formaldehyde resins from Example 1, several more shellac data points were collected to generate the fraction fade curve, which is shown in FIG. 2. As can be seen in FIG. 2, when from 1 w % to 5 wt % of shellac (Dewaxed Super Blonde shellac) is added (to the ink with 1.8 wt % or 3.6 wt % phenol-formaldehyde resin (REACTOL™ 1111E), fraction fade (based on a curve generated from the individual data points) range from about 10% to about 50% (or about 0.1 to about 0.5). With the range from about 2 wt % to 4 wt % shellac, the fraction fade was from about 10% to about 30% (or about 0.1 to about 0.3). If the goal of fraction fade is to only lose 30% of the printed image from rub resistance testing (0.3 or better), this can be achieved at about 2 wt % in one example, with the maximum rub resistance occurring at about 4 wt %, for example. Notably, at 4 wt %, the rub resistance outperformed slightly the rub resistance (or fraction fade) at 5 wt %. As shellacs can introduce decap performance issues when added at larger concentrations, by adding 4 wt % (rather than 5 wt %), less decap performance amelioration may be possible with the highest degree of durability with these specific components tested. With different phenol-formaldehyde resins and/or different shellacs, these values may be slightly different, so the range of 1 wt % to 5 wt % would be a reasonable range of added shellac that can be used to provide added durability in accordance with examples of the present disclosure.

Example 3—Non-Aqueous Ink Compositions with Phenol-Formaldehyde Resin and a Tackifier Resin or Shellac and Print Durability on Non-Porous Biaxially-Oriented Polypropylene Substrates As a result of the positive durability results for shellacs and/or various tackifier resins combined with phenol-formaldehyde resins from Example 1, various formulation modifications were made to try to achieve good durability (fraction fade 30% or better) instead of the "acceptable" durability (fraction fade 50% or better) achieved by some of the tackifiers, particularly the tackifier resins. As indicated by the results of Examples 1 and 2, by adding in a tackifier resin or shellac to a non-aqueous ink composition containing a phenol-formaldehyde resin, a more robust ink for adhesion to untreated, non-porous, biaxially oriented polypropylene was formulated. The non-aqueous ink compositions, in some examples, can further be formulated with very long decap times and good kogation properties. Non-aggressive solvents, such as ethanol, can be used which are highly compatible with the typical thermal inkjet printheads and other architectures without causing deterioration. In Table 3, additional data for four different non-aqueous ink compositions is provided, all of which can be formulated to exhibit a fraction fade of about 0.3 (+/−) or less. The non-aqueous ink composition formulation used for the ink compositions in Table 3 below were similar to that shown in Table 1, which included 1.8% wt % phenol-formaldehyde resin.

TABLE 3

Fraction Fade as Function of Tackifier Added in Non-aqueous Ink Vehicle of Table 1 formulated with solvent soluble dye**

| Tackifier | Type | Acid Number (mg KOH/g) | Fraction Fade (at 3 wt % Tackifier) |
|---|---|---|---|
| Dewaxed Super Blonde Shellac | Shellac | AN 71-79 | 0.16 |
| PENTALYN ® 670-M | Partially esterized fumaric adduct of rosin | AN 176 | 0.28 ± 0.1 |
| FILTREZ ™521 | Fumaric modified rosin ester | AN 217 | 0.24 ± 0.06 |
| REACTOL ™ 5145 | Polyester resin | AN 125 | 0.30 ± 0.05 |

Dewaxed Super Blonde Shellac is available from Shellac Shack, Oregon.
REACTOL ™, FLEX-REZ ™, and FILTREZ ™ are available from Lawter, Inc., Illinois.
PENTALYN ® is available from Eastman Chemical, Tennessee.

Example 4—Dry Time, Decap and Kogation Performance

As mentioned, adding shellac to a non-aqueous ink composition as described herein can have an impact on decap performance, even when some types of decap additives are included to ameliorate some of this effect. Additionally, kogation issues can likewise be introduced when adding these types of binder materials, e.g., the phenol-formaldehyde resin and the tackifier, e.g., shellac. In either case, decap and/or kogation can still be acceptable when included in some examples, but in order to move from acceptable decap and/or kogation performance to good or excellent decap and/or kogation performance, various types of additives can be included to provide an even better ink composition with respect to printability, while remaining an acceptably durable non-aqueous ink composition when printed on non-porous polymeric substrates, additive(s) can be included.

In accordance with this, decap and kogation testing was conducted where various additives were included to improve printability performance. For this evaluation, the following non-aqueous ink compositions were prepared, as shown in Table 4 (along with respective dry times).

TABLE 4

Non-aqueous Ink Composition Comparative for Decap and Kogation

| Component | Type | Ink 1 (wt %) | Ink 2 (wt %) | Ink 3 (wt %) | Ink 4 (wt %) |
|---|---|---|---|---|---|
| Ethyl acetate | Perfluoropolyether-dissolving co-solvent | 5 | 5 | 5 | 5 |
| FLUOROLINK ® A10P | Dialkyl amide perfluoropolyether | 0.3 | 0.3 | 0.3 | 0.3 |
| SURFYNOL ™ 485 | Surfactant | — | 0.15 | — | 0.1 |
| TERGITOL ® 15-S-7 | Surfactant | — | — | 1 | 0.5 |
| REACTOL ™ 1111E* | Phenol-formaldehyde resin | 3.6 | 1.8 | 1.8 | 1.8 |
| Shellac | Tackifier | 3 | 2.5 | 2.5 | 2.5 |
| VALIFAST ® 3808 | Dye | 5.9 | 5.9 | 5.9 | 5.9 |
| Ethanol | Alcohol solvent | Balance | Balance | Balance | Balance |
| Dry Time (seconds) | | 3 | 7 | 7 | 3-5 |

VALIFAST ® is from Orient Chemical Industries, California.
REACTOL ™ 1111E is from Lawter, Inc., Illinois.
Shellac is Dewaxed Super Blonde shellac from Shellac Shack, Oregon.

Dry time was tested by printing a rectangular block of the various ink compositions on untreated biaxially-oriented polypropylene film using a Motiv6 HP® ink jet printer. The untreated biaxially-oriented polypropylene film had a surface energy of about 30-32 mNm. The amount of time that passed for the ink to dry to the touch was recorded.

Decap was tested for these four inks (Ink 1, Ink 2, Ink 3, and Ink 4) at four time periods (left uncapped), e.g., 10 seconds, 60 seconds, 5 minutes, and 15 minutes. After the uncapped time period, or decap time, sample print plots were prepared for the various inks, for a total of sixteen (16) sample print plots. The print plots include solid printed portions, regions with fine vertical stripes, and regions with rectangular grids. The printhead used for the testing was a thermal inkjet printhead with 600 total nozzles (300 odd and 300 even) sized at about 30 microns in diameter per nozzle. The printhead was set to 300 drops per inch and the print speed was set to run at about 40 inches per second using even nozzles. To prepare the printheads for evaluation, the four inks were individually loaded in respective print cartridges and the printhead fired so that all of the nozzles ejected ink. The printhead was then left uncapped for the various time periods set forth above.

Evaluation of the sample decap print plots, which compared Inks 1-4, revealed that decap performance for inks 2-4 was acceptable up to the 15 minutes tested, whereas Ink 1 was acceptable to 10 seconds, and became unacceptable at some point between 10 seconds and 60 seconds where missing print plot lines started to appear initially, but were quickly self-correcting within a few centimeters. At 5 minutes and 15 minutes, it took nearly the entire line plot before the printhead began firing from most printhead nozzles. Thus, by adding even a small amount of surfactant, such as Tergitol® 15-S-7, and Surfynol® 485, acceptable decap performance moved from less than 60 seconds to more than 15 minutes. In this specific example, when more than 0.15 w % of the Surfynol® 485 was added, the Valisfast® 3808 dye began to precipitate, so if more is to be used, then a different dye choice or limiting the Surfynol® 485 to 0.15 wt % may be a good formulation choice. Though the surfactants reduced dry time slightly, these dry time ranges are still considered acceptable. If faster dry time is desired, as can be seen by combining Surfynol® 485 with the Tergitol® 15-S-7 at lower concentrations, the dry time could be mostly regained.

With respect to kogation, the addition of shellac can sometimes have an impact on printhead kogation. This may be because a thermal-inkjet printhead gets momentarily hot at the resistor surface, which can cause the shellac to further polymerize into an ethanol-insoluble material (with the chain length potentially growing). To illustrate, Ink 4 from Table 4 was tested for kogation, and after 500,000 drops being fired, kogation was observed. Kogation can be a result of a residue build up at the firing resistor which can inhibit heat transfer to ink resulting in little or no (weak) ink drop discharged from the fluid ejector, and can be a residue from any of a number of components that may be present in the ink, including the alcohol-insolubilized shellac and/or occluded dye in the ink. Though the inks described herein are printable, to enhance the longevity of the printhead, various additives, namely alkyl amines, were included to try to ameliorate issues related to kogation. As the formation of alcohol-insoluble shellac material tends to be acid catalyzed, the addition of a basic material could reduce this effect and improve further the ink compositions of the present disclosure. Table 5, for example, shows that adding various alkyl amines stops kogation out to at least 6M drops fired.

TABLE 5

Anti-kogation Additives

| Additive | Concentration (wt %) | Kogation @ 6M Drops Fired? |
|---|---|---|
| None | — | Yes |
| Dodecylamine | 0.25 | No |
| Dodecylamine | 0.5 | No |
| Dodecylamine | 1.5 | No |
| Isopropylamine | 0.5 | No |
| Oleylamine | 0.5 | No |
| 2-Ethyl-1-hexylamine | 0.5 | No |

What is claimed is:

1. A non-aqueous ink composition, comprising:
   from 70 wt % to 98 wt % alcohol solvent;
   from 1 wt % to 6 wt % phenol-formaldehyde resin;
   from 0.05 wt % to 1 wt % perfluoropolyether;
   from 1 wt % to 5 wt % tackifier, wherein the tackifier includes a shellac having an acid number from 50 KOH/g to 100 mg KOH/g or a tackifier resin selected from a polyamide, a phenolic resin, an unmodified rosin resin, an unmodified copal resin, or a combination thereof, wherein the tackifier resin has an acid number from 100 mg KOH/g to 300 mg KOH/g; and from 1 wt % to 14 wt % organic solvent-soluble dye.

2. The non-aqueous ink composition of claim 1, wherein the tackifier includes the shellac.

3. The non-aqueous ink composition of claim 1, wherein the shellac is dewaxed shellac.

4. The non-aqueous ink composition of claim 1, wherein the tackifier is present in the non-aqueous ink composition at from 2 wt % to 3 wt %.

5. The non-aqueous ink composition of claim 1, further comprising from 0.1 wt % to 2 wt % of an amine compound.

6. The non-aqueous ink composition of claim 1, further comprising a nonionic surfactant.

7. The non-aqueous ink composition of claim 1, wherein the alcohol solvent is methanol, ethanol, n-propanol, isopropanol, cyclopropanol, n-butanol, 2-butanol, isobutanol, tert-butanol, cyclobutanol, or a combination thereof.

8. The non-aqueous ink composition of claim 1, wherein the phenol-formaldehyde resin includes a C3 to C8 alkyl-modified phenol-formaldehyde resin.

9. A printing system, comprising:
a non-aqueous ink composition, including from 70 wt % to 98 wt % alcohol solvent,
from 1 wt % to 6 wt % phenol-formaldehyde resin,
from 0.05 wt % to 1 wt % perfluoropolyether,
from 1 wt % to 5 wt % tackifier, wherein the tackifier includes a shellac having an acid number from 50 KOH/g to 100 mg KOH/g or a tackifier resin selected from a polyamide, a phenolic resin, an unmodified rosin resin, an unmodified copal resin, or a combination thereof, wherein the tackifier resin has an acid number from 100 mg KOH/g to 300 mg KOH/g, and from 1 wt % to 14 wt % organic solvent-soluble dye; and a non-porous polymeric substrate.

10. The printing system of claim 9, wherein the non-porous polymeric substrate has a surface energy from 18 mN/m to 35 mN/m.

11. The printing system of claim 9, wherein the tackifier includes a shellac.

12. The printing system of claim 9, wherein the phenol-formaldehyde resin includes a C3 to C8 alkyl-modified phenol-formaldehyde resin.

13. The printing system of claim 9, wherein the non-porous polymeric substrate is untreated non-porous polymeric substrate.

14. A method of printing, comprising ejecting a non-aqueous ink composition onto a non-porous polymeric substrate,
the non-aqueous ink compositing, comprising from 70 wt % to 98 wt % alcohol solvent,
from 1 wt % to 6 wt % phenol-formaldehyde resin,
from 0.05 wt % to 1 wt % perfluoropolyether,
from 1 wt % to 5 wt % tackifier, and
from 1 wt % to 14 wt % organic solvent-soluble dye,
wherein the tackifier includes a shellac having an acid number from 50 KOH/g to 100 mg KOH/g or a tackifier resin selected from a polyamide, a phenolic resin, an unmodified rosin resin, an unmodified copal resin, or a combination thereof,
wherein the tackifier resin has an acid number from 100 mg KOH/g to 300 mg KOH/g.

15. The method of claim 14, wherein the non-porous polymeric substrate has a surface energy from 18 mN/m to 35 mN/m.

16. The method of claim 14, wherein the phenol-formaldehyde resin includes a C3 to C8 alkyl-modified phenol-formaldehyde resin and the tackifier includes a shellac.

17. The method of claim 14, wherein the non-porous polymeric substrate is untreated non-porous polymeric substrate.

* * * * *